No. 65,559.  
C. GOOCH.  
ICE CREAM FREEZER.  
PATENTED JUNE 11, 1867.

WITNESSES:  
Jas. H. Layman  
H. C. Webber

INVENTOR:  
C. Gooch  
By Knight Bro.  
Atty

United States Patent Office.

CHARLES GOOCH, OF CINCINNATI, OHIO.

Letters Patent No. 65,559, dated June 11, 1867

IMPROVED ICE-CREAM FREEZER.

*The Schedule referred to in these Letters Patent and making part of the same.*

TO WHOM IT MAY CONCERN:

Be it known that I, CHARLES GOOCH, of Cincinnati, in the county of Hamilton, and State of Ohio, have invented a new and useful Ice-Cream Freezer; and I hereby declare the following to be a full, clear, and exact description thereof, reference being had to the accompanying drawings, making part of this specification.

This invention is chiefly designed for the class of ice-cream freezers in which the beater or agitator and the receptacle for the cream revolve in opposite directions, and comprises a form of agitator adapted to simultaneously remove the frozen cream from the sides, and replace it with other portions by an alternate inward and outward action, and a provision of wings on the periphery of the can adapted to agitate that portion of the ice in immediate contact with said periphery.

Figure 1:
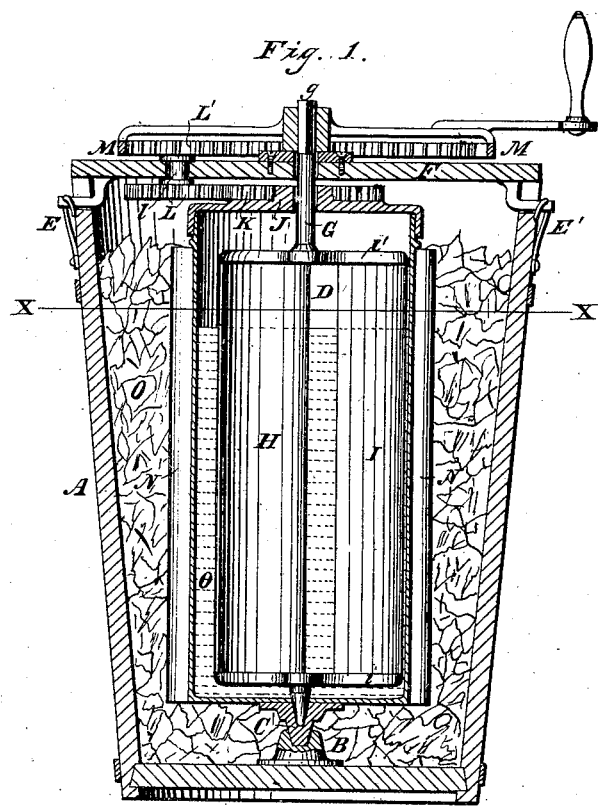
Figure 1 is an axial section of an ice-cream freezer embodying my improvements.
Figure 2:
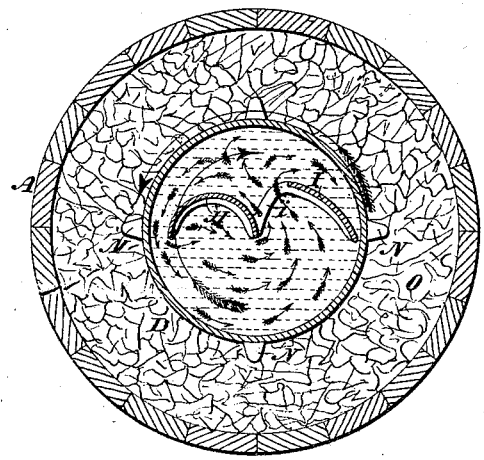
Figure 2 is a horizontal section at the line X X.

A is a tub, to whose bottom is attached a step, B, for the pivot C of the cream-can, or receptacle D, of cylindrical form. Secured by hooks E E', or other device, athwart the mouth of the tub, is a transom, F, perforated at its middle for the stem G of my agitator C G H I. The cap J of the can D has attached to it a spur-wheel, K, driven by a wheel, L, whose shaft, $l$, traversing the transom F, has another wheel, L', above said transom, whose motion is derived from the drive-wheel M, which wheel occupying the non-circular summit, $g$, of the stem G, secures a simultaneous opposing rotation of the can and agitator respectively. The periphery of the can D is armed with one or more vertical or nearly vertical wings or ribs, N, which act to constantly displace the warmed portions of the ice in the annular space, O, between the can and the tub, and to leave the portions of the ice nearest to the sides of the tub comparatively undisturbed, as they should be, in order to avoid the too rapid melting of the ice. The agitator consists essentially of two blades H I, preferably in the form of cylindrical or otherwise curved segments, both on one side of and having their concavities presented towards a common axial plane. Of these blades the blade H extends from the centre to some distance from the concavity of the can, while the blade I is supported by arms $i$ $i'$, with its inner edge some distance from the centre, and with its outer edge nearly scraping the concavity of the can.

The action of this agitator is to most rapidly and effectually beat up and cool the cream, the blade H operating to drive the cream against the concave sides of the can, and the blade I to scrape the thus cooled portions from the sides and compel them to seek the middle of the can and to pass between the inner edges of the blades, to be again pressed and abraded against the said sides.

While selecting the preferred form for illustration, I reserve the right to vary the same so long as the same results are obtained by means substantially equivalent; for example, instead of the agitator and can revolving in opposite directions, the agitator can be fixed and the can may rotate around it, or *vice versa*. The blades of the agitator instead of being curved as represented, may be flat, or nearly so.

I claim herein as new, and of my invention—

The combination of the concave scraper I to remove the frozen cream from the walls of the can D, the convex agitator H extending from near the centre of said can arranged with a space, $i$, between them, and adapted to operate as herein described.

In testimony of which invention I hereunto set my hand.

CHARLES GOOCH.

Witnesses:
GEO. H. KNIGHT,
JAMES H. LAYMAN.